United States Patent [19]

Nordstrom

[11] Patent Number: 4,540,080
[45] Date of Patent: Sep. 10, 1985

[54] END STOP FOR CARGO LOADING SYSTEM
[75] Inventor: Arnold B. Nordstrom, Torrance, Calif.
[73] Assignee: Ancra Corporation, El Segundo, Calif.
[21] Appl. No.: 426,720
[22] Filed: Sep. 29, 1982
[51] Int. Cl.³ .................. B65G 11/20; B60N 1/00
[52] U.S. Cl. ........................ 193/40; 410/79; 410/55
[58] Field of Search .............. 193/32, 35 A, 40; 403/381, 353; 248/503.1, 499, 505; 104/254, 258; 410/101, 102, 111, 115, 116, 104, 105, 73–76, 79

[56] References Cited
U.S. PATENT DOCUMENTS

| | | | |
|---|---|---|---|
| 3,306,234 | 2/1967 | Hansen et al. | 410/92 X |
| 3,422,508 | 1/1969 | Higuchi | 410/105 |
| 3,480,239 | 11/1969 | Jensen et al. | 410/79 |
| 4,109,891 | 8/1978 | Grendahl | 248/503.1 |

Primary Examiner—Andres Kashnikow
Assistant Examiner—L. E. Williams
Attorney, Agent, or Firm—Edward A. Sokolski

[57] ABSTRACT

An end stop for restraining the motion of a pallet in a cargo loading system, such as might be employed in an aircraft. A pair of similar left and right-hand pieces are removably mounted in a track or mounting channel having alternate lip and cutout portions. Each of these members has a main body portion having an elongated tension lug extending normally along the bottom edge thereof and a plurality of shear lugs directly above the tension lugs and extending substantially parallel thereto, such lugs being spaced from each other along the longitudinal extent of the main body. Each body portion further includes an overhanging restraining arm extending along the top edge of the body in a direction substantially normal to that in which the shear and tension lugs extend, a stop plate extending downwardly from the inner edge of the restraining arm in a direction normal thereto and a sloped shoulder which extends outwardly from the bottom edge of the stop plate towards the bottom edge of the body portion. The paired body portions are locked into the track with the tension lugs inserted in the track under opposing lip portions thereof with the shear lugs abutting against cutout portions of the track; the tops of the paired body members being joined together by suitable means such as a nut and bolt.

6 Claims, 5 Drawing Figures

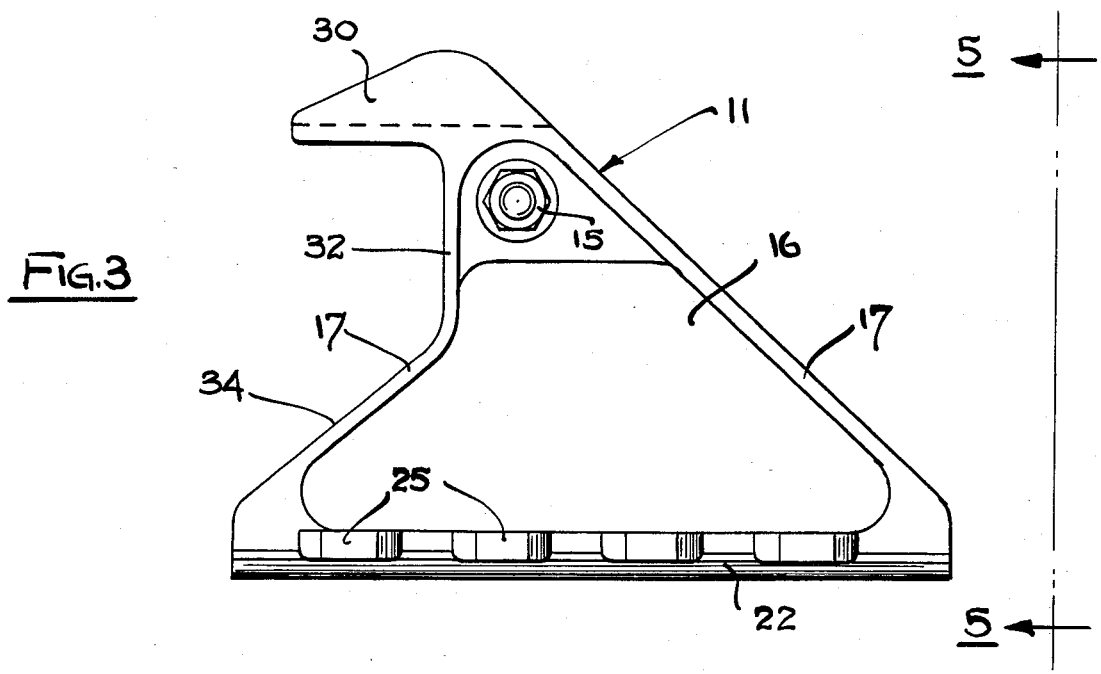
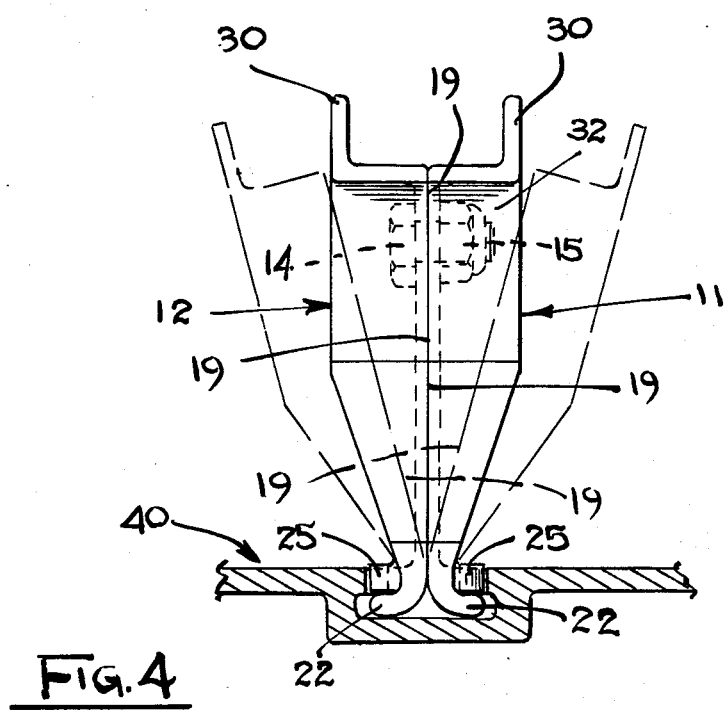

END STOP FOR CARGO LOADING SYSTEM

This invention relates to cargo loading systems, and more particularly to an end stop for use in such a system which employs a pair of similar stop and restraining members suitable for installation in a track.

A number of cargo loading systems have been designed suitable for loading cargo onto aircraft and other vehicles, such systems employing rollers on which cargo-loaded pallets can be moved into position for transportion and restrained in this position by suitable restraining devices. A typical such system is described in U.S. Pat. No. 3,480,239 to Jensen et al., issued Nov. 25, 1969. Systems such as described in the Jensen patent are primarily designed for use in aircraft and employ tracks or mounting channels having alternate lip and cutout portions which are installed in the floor of the aircraft, such channels being suitable for use in either mounting passenger chairs or cargo as the need may arise. In the loading of cargo, end stops or locks are required to terminate the forward motion of the pallet into the aircraft at a predetermined position and to restrain the pallet in such position. Such an end stop or lock is shown in FIG. 4 of the aforementioned Jensen patent. This prior art device employs a plurality of downwardly extending lug members which fit into the track and are restrained in this position by means of a spring actuated plunger which fits into the cutout portions of the track.

This type of end stop construction is rather expensive in construction, and in view of the spring actuated moving plunger involved presents maintenance and reliability problems. The end stop assembly of the present invention provides advantages over end stops of the prior art in its simplified construction which is more economical to fabricate, provides greater reliability of operation and is lighter in weight, the last of these factors being of particular significance in an aircraft installation. The above enumerated advantages are afforded without any sacrifice whatsoever in function, the device of the present art being capable of enhanced load handling capacity while reducing local severe loading on the track structure.

Briefly described the device of the present invention comprises a pair of similar body members which in their installed position are joined together by suitable means such as a nut and bolt. Each of the body members includes tension lug means running along the bottom edge thereof and extending outwardly normally from the body and shear lug means extending outwardly from the body portion in substantially the same direction as the tension lug means, the shear lug means being directly above and opposite the tension lug means and spaced apart along the longitudinal extent of the body member. Each body member further includes an overhanging restraining arm which extends from the top edge thereof in a direction normal to the shear and tension lug means, a stop plate which runs downwardly from the inner edge of the restraining arm in a direction substantially normal thereto and a sloped shoulder portion which extends outwardly and downwardly from the bottom edge of the stop plate towards the bottom edge of the body portion.

It is therefore an object of this invention to provide an end stop for a cargo loading system which is of simpler and more involved presents maintenance and reliability problems. The end stop assembly of the present invention provides advantages over end stops of the prior art in its simplified construction which is more economical to fabricate, provides greater reliability of operation and is lighter in weight, the last of these factors being of particular significance in an aircraft installation. The above enumerated advantages are afforded without any sacrifice whatsoever in function, the devices of the present art being capable of enhanced load handling capacity while reducing local severe loading on the track structure.

Briefly described the device of the present invention comprises a pair of similar body members which in their installed position are joined together by suitable means such as a nut and bolt. Each of the body members includes tension lug means running along the bottom edge thereof and extending outwardly normally from the body and shear lug means extending outwardly from the body portion in substantially the same direction as the tension lug means, the shear lug means being directly above and opposite the tension lug means and spaced apart along the longitudinal extent of the body member. Each body member further includes an overhanging restraining arm which extends from the top edge thereof in a direction normal to the shear and tension lug means, a stop plate which runs downwardly from the inner edge of the restraining arm in a direction substantially normal thereto and a sloped shoulder portion which extends outwardly and downwardly from the bottom edge of the stop plate towards the bottom edge of the body portion.

It is therefore an object of this invention to provide an end stop for a cargo loading system which is of simpler and more economical construction than prior art such devices.

It is a further object of this invention to provide an improved end stop device for a cargo loading system which is of lighter weight than prior art such devices.

It is still a further object of this invention to provide an improved end stop device for cargo loading systems which has an enhanced load handling capacity and with which local severe loading on the supporting channel or track structure is reduced.

Other objects of this invention will become apparent as the description proceeds in connection with the accompanying drawings of which:

FIG. 3 is a side elevational view of the preferred embodiment;

FIG. 4 is an end elevational view of the preferred embodiment; and

Figure 1:
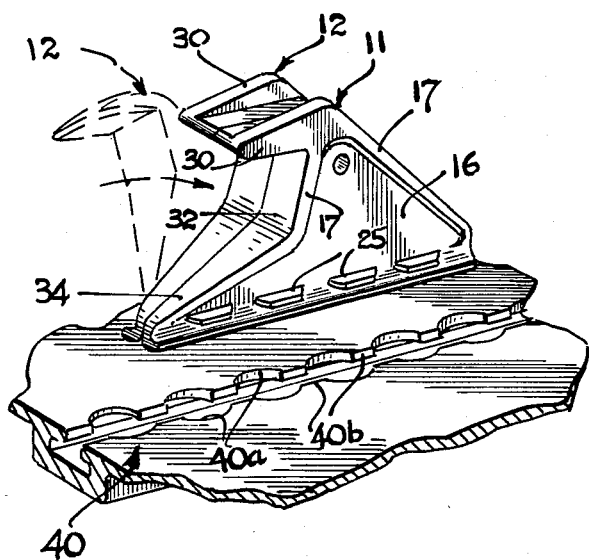
FIG. 1 is a perspective drawing showing a preferred embodiment of the invention immediately prior to being installed in a supporting channel or track structure.

Referring now to the figures, a preferred embodiment of the invention is illustrated. The device comprises a pair of similar body members 11 and 12 which in the preferred embodiment are mirror images of each other. In the installed position, the body members are joined together by a bolt 14 and nut 15, the bolt extending through apertures (not shown) formed in the body members. Each body member has a central, substantially flat surface portion 16 and a perimeter wall portion 17 which extends normally from the central portion and forms a perimeter running around a portion of the edge thereof. The body portion has a flat inner surface 19 opposite to surface 16.

Extending substantially normally and outwardly from the bottom edge of surface 16 is an elongated tension lug 22. Directly above and opposite tension lug 22 and extending outwardly from surface 16 in substantially the same direction as the tension lug are a plurality of shear lugs 25. In lieu of an elongated tension lug, a plurality of short tension lugs could be employed. Also, in certain instances, a single shear lug could be used on each body member.

Extending outwardly along the top edge of the body portion in a direction substantially parallel to the longidutinal axis of the body portion is an overhanging restraining arm portion 30. Extending downwardly from the inner edge of restraining arm 30 is a stop plate portion 32, there being a sloped shoulder portion 34 extending from the stop plate outwardly and downwardly towards the bottom of the body member.

Figure 2:
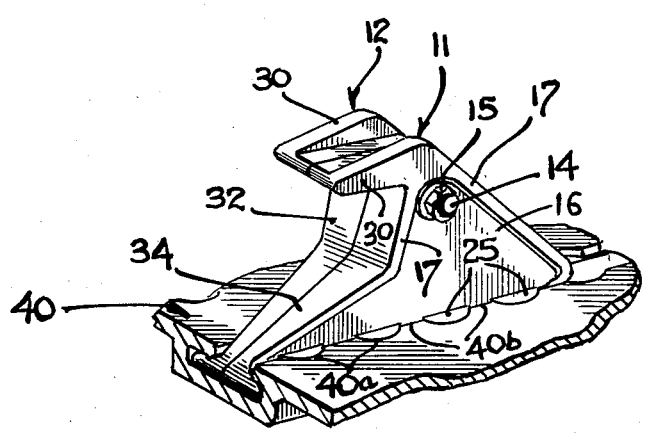
FIG. 2 is a perspective view showing a preferred embodiment of the invention installed in a channel or a track structure.
Figure 5:
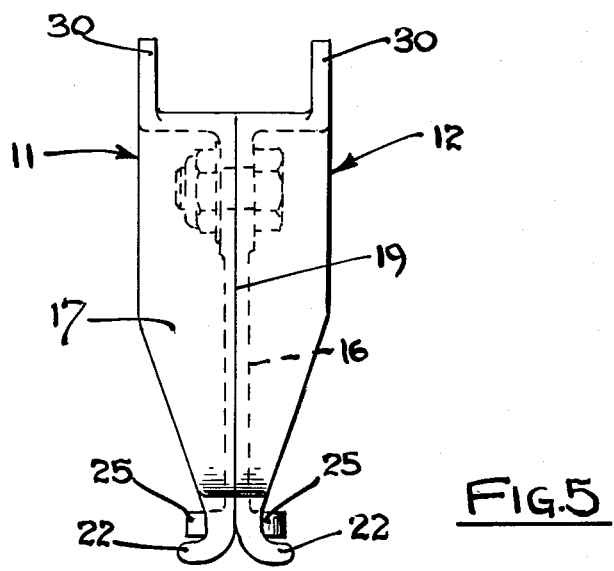
FIG. 5 is an end elevational view taken along the plane indicated by 5—5 in FIG. 3.

The device is installed in a mounting track 40, having alternate lip and cutout portions, in the following manner. First, as shown by the dotted line configurations of the body members in FIGS. 1 and 4, the two members are placed with their inner flat surfaces 19 opposite each other, and the upper portions thereof are moved outwardly to enable the insertion of the tension lugs 22 in the track under the lip portions 40b. The top portions of the two body members are then drawn together and bolt 14 and nut 15 employed to hold the members together with the tension lugs retained in the track or channel member as shown in FIGS. 2 and 4. In this installed position, as can best be seen in FIG. 2, the shear lugs 25 are located in the cutout portions 40a between the lip portions 40b of the track. In this position of abutment against the walls of the cutout portions, the shear lugs handle shear loads placed on the end stops while the tension lugs installed in the track under lip portions 40b handle tension loads. It should be apparent that the device can easily be installed and removed by means of a single bolt 14 and nut 15, along with a simple rocking motion to bring the top portions of the body members together or apart as the case may be. In certain applications, it may be desirable to bond the body members together for permanent istallation in the track.

While the device of the invention has been described and illustrated in detail, it is to be clearly understood that this is intended by way of illustration and example only and is not to be taken by way of limitation, the spirit and scope of the invention being limited only by the terms of the following claims.

I claim:

1. An end stop member for installation in a track member for restraining the motion of cargo handling means, said track member having a plurality of cutout portions spaced between lip portions comprising:
   (1) a pair of similar body members, each of said body members comprising:
   (a) stop plate means for terminating the travel of said cargo handling means,
   (b) tension lug means extending normally and outwardly from the surfaces of said body members,
   (c) shear lug means extending outwardly and substantially normally from the surfaces of said body members directly opposite and above the tension lug means, said shear lug means being arranged and aligned substantially parallel to the longitudinal axis of the tension lug means,
   (d) an overhanging restraining arm extending from the top edge of the stop plate means in a direction substantially parallel to the longitudinal axis of the tension lug means,
   (e) a sloped shoulder portion extending downwardly and outwardly from the bottom edge of the stop plate means, and
   (2) means for joining said body members together with the tension lug means installed in said track beneath the lip portions thereof and the shear lug means installed in the cutout portions of said track.

2. The device of claim 1 wherein the means for joining the body members together comprises a bolt extending through said body members and a nut retaining the bolt to the body members.

3. The device of claim 1 wherein each of said body members includes a flat central surface portion on one side thereof with an edge wall extending substantially normally from said surface portion and forming a perimeter around a substantial part of said surface portion.

4. The device of claim 3 wherein the surfaces of said body members opposite said surface portions thereof are substantially flat and abut against each other in mating relationship in the installed position.

5. The device of claim 1 wherein the tension lug means comprises a single elongated tension lug.

6. The device of claim 1 or 5 wherein the shear lug means comprises a plurality of shear lugs.

* * * * *